(12) United States Patent
DeLucia et al.

(10) Patent No.: US 8,700,475 B1
(45) Date of Patent: Apr. 15, 2014

(54) WIRELESS INDUSTRY MARKETING BUSINESS PROCESS

(75) Inventors: Keith DeLucia, Lloyd Harbor, NY (US); Claudio R. Ballard, Lloyd Harbor, NY (US)

(73) Assignee: Datatreasury Corporation, Plano, TX (US)

( * ) Notice: Subject to any disclaimer, the term of this patent is extended or adjusted under 35 U.S.C. 154(b) by 2257 days.

(21) Appl. No.: 11/244,654

(22) Filed: Oct. 5, 2005

Related U.S. Application Data

(60) Provisional application No. 60/615,887, filed on Oct. 5, 2004.

(51) Int. Cl.
*G06Q 30/00* (2012.01)

(52) U.S. Cl.
USPC .......................................................... 705/26.1

(58) Field of Classification Search
USPC ............................................. 705/26, 27, 26.1
See application file for complete search history.

(56) References Cited

U.S. PATENT DOCUMENTS

| | | | |
|---|---|---|---|
| 7,483,952 B2 * | 1/2009 | Light et al. .................... | 709/207 |
| 2004/0043753 A1 * | 3/2004 | Wake et al. .................... | 455/406 |

* cited by examiner

*Primary Examiner* — Mila Airapetian

(74) *Attorney, Agent, or Firm* — Hershkovitz & Associates, PLLC; Abraham Hershkovitz

(57) ABSTRACT

The revenue stream of a master agent and a Sub Agent marketing wireless products and services is enhanced by providing wireless services not provided by upstream Carriers of wireless services. The master Agent or Sub Agent can independently contract to market the wireless services of other third parties, where such wireless services are not provided by the upstream Carrier. These ancillary wireless services are then marketed to the customer base of the Sub Agent, together with the wireless products or services of the upstream Carrier.

9 Claims, 2 Drawing Sheets

WIRELESS INDUSTRY MARKETING BUSINESS PROCESS

RELATED APPLICATION

This non-provisional patent application claims the benefit of provisional application entitled "Wireless Industry Marketing Business Process", filed Oct. 5, 2004, and accorded Ser. No. 60/615,887.

TECHNICAL FIELD OF THE INVENTION

The present invention relates in general to marketing techniques, and more particularly to the marketing of services available through wireless devices.

BACKGROUND OF THE INVENTION

The essential elements of this new business process address the business market commonly referred to as "wireless technology industry" that today solely markets and sells cellular telephones and other wireless data devices to the business and consumer markets. This industry is broken down into four tiers as described below and as shown in FIG. 1.

Hardware Manufacturers

Hardware manufacturers are entities that design, develop, build and sell cellular telephones and wireless PDAs (Personal Digital Assistants) intended for business and consumer use. At this time there is a rapid technology convergence occurring so that already many cell phone models offer an integrated digital camera and in some cases even PDA functionality as a full featured single device that can be a phone, camera and PDA—all in one. Hardware manufacturers typically receive their sole compensation through sale of the hardware to Carriers. An example hardware manufactures include Motorola, Nokia, Sony, Sanyo, Siemens, Palm, and a host of others.

Carriers

Carriers, sometimes also known as network service providers, build, operate and maintain the wireless network on which the above mentioned cellular telephones and wireless PDAs operate. The carrier networks typically operate with very specific communication protocols such as GSM, TDMA, CDMA and GRPS. Carriers dictate to the hardware manufacturers the operational standards, supported and/or desired functionality and network communication protocols to which they must adhere to in order for their hardware to be certified to operate on a given carrier's network. Carriers sell their solutions to their customers by typically bundling a hardware device (cell phone and/or wireless PDA) along with predetermined network usage parameters (such as minutes per month, data storage space and amount of permissible data transmission per month, etc.) into a fixed period of time contract that often calls for a multi-year commitment by the end-user customer. A common requirement is a steep cancellation fee in the event of early contract termination by the end-user customer. Approximately 60% to 70% of carrier sales are driven through direct sales to end-user customers and 30% to 40% through indirect NAR reseller channels—known as Master Agents and Sub Agents, as described in more detail below. Carriers generate most of their revenues by selling the use of their networks for voice and data, often giving the hardware away or otherwise substantially subsidizing its cost via rebates in order to induce a customer to sign multi-year contractual commitments. Selected examples of Carriers include AT&T Wireless, Verizon Wireless, Sprint, Cingular, T-Mobile, NexTel, and a host of others.

Master Agents

Master Agents are entities that act as a distribution channel for Carriers by delivering the Carrier's products and services to Sub Agents who in turn sell the products and services directly to the end-user customer. Master Agents usually have an exclusive geographical territory granted by Carriers in return for which they have the responsibility to provision, distribute and support the hardware that is sold to Sub Agents. In many instances a given Master Agent holds distribution rights for one or more Carriers within some or all of their geographic coverage territories. Master Agents receive compensation in three basic ways:

a. make a profit on the sale of each piece of hardware to Sub Agents;
  b. receive hardware rebate dollars from the Carriers, wherein the Master Agent often has sole discretion to share any or some portion of the rebate with the Sub Agent;
  c. receive a recurring residual payment, typically equal to 10% of the actual monthly Carrier usage bill charged to the end-user customer, a portion of which may be shared with the Sub Agent at the sole discretion of the Master Agent Sub Agents Sub Agents resell Carrier products and services distributed to them by Master Agents (or in some instances directly from the Carrier itself) to their end-user customer base comprised of business customers and consumers. Sub Agents receive compensation in four basic ways:

a. customer acquisition fee—essentially a one-time commission paid by the Carrier to the Sub Agent for signing up a customer to a fixed term contract to use the Carrier's products and services;
  b. make a profit on the sale of each piece of hardware that is sold;
  c. in certain cases a sub agent may receive a portion of the recurring monthly usage bill charged by the Carrier typically at the sole discretion of the Master Agent through which the Sub Agent sold the particular transaction; and
  d. sales of miscellaneous low margin one-time sale hardware accessories, such as hands free head phones, extended life batteries, additional battery chargers as well as other items.

From the Master Agent to the Sub Agent, compensation is essentially based upon reselling Carrier products and services, where most of the revenues are one-time payments, and at the Master Agent level an ongoing share of the Carrier's monthly billing to the end-user customer. Particularly, in the case of Sub Agents, they often do not participate in any ongoing residual monthly Carrier billing revenue stream, and instead rely principally upon one-time sales from the sale of Carrier products and services and sales of accessories. Typically, end-user customers of Sub Agents are notoriously fickle and disloyal and will easily shift future purchases to other Sub Agents. Thus, a Sub Agent can never rely on repeat business. Furthermore, Sub Agents face significant fixed infrastructure costs such as the rent for a store (or office) from where Carrier products and services are marketed and sold in their local geographic area, clerical personnel, and sales personnel, together with all the other fixed costs associated with running and managing a small business. In general, it's a very competitive business that usually requires multiple store locations to achieve any meaningful revenue and profitability levels.

From the foregoing, it can be seen that a need exists for a new business method that allows Master Agents and Sub Agents to market associated wireless services to customers, where the wireless services are not necessarily provided by the Carriers. Another need exists for a business method in which Master Agents and Sub Agents can establish revenue streams from the sales of web-based wireless services to customers of the wireless devices sold by the Master Agents or the Sub Agents

SUMMARY OF THE INVENTION

In accordance with the principles and concepts of the invention, Sub Agents can exploit business opportunities by providing services to wireless customers, who could not otherwise obtain the services in the wireless hierarchy as it is now known. The Sub Agents can expand the wireless services available to their customer base by arranging wireless services not available from the Carriers, and making such wireless services available to their wireless customers.

The Master Agents may find it advantageous to initially make the necessary business arrangements with the various wireless services not presently offered by the Carriers, and package and market such wireless services to the Sub Agents for dealing directly with the wireless customers. The wireless services available to the customers is thus unlimited, and includes those services that the Carriers can not now provide due to business strategies, laws and regulations, consent agreements, etc.

According to one feature of the invention, a customer who purchases a cell phone or other wireless device from a Sub Agent, will also have available from the Sub Agent wireless services for use by the wireless device, such as the ability to store in a virtual memory on the interne the photographs or images generated by the wireless device. The customer may also have available a wireless service for storing documents or audio conversations in a virtual memory that were generated or captured by the wireless device. Wireless devices, such as credit card swipe equipment may utilize the wireless services of the Sub Agent for automatically accessing credit card verification services, whereby customers can carry out credit card transactions in mobile situations. These wireless services are prearranged by the Master Agent or the Sub Agent as ancillary services, and are packaged and priced for marketing to customers of the Sub Agent.

According to another feature of the invention, disclosed is a method of enhancing revenues for a Sub Agent marketing wireless products. The method includes marketing to users of wireless devices the wireless products of an upstream Carrier, and marketing to the users of the wireless devices the wireless services not provided by the upstream Carrier but provided by third parties. The method further includes the receiving of revenues from the upstream Carrier for sales of products of the upstream Carrier to the users of the wireless devices, and receiving revenues from third parties for the sale of the products provided by said third parties, and sold to users of the wireless devices.

According to yet another feature of the invention, disclosed is a method of enhancing revenues for a Sub Agent marketing wireless products, including marketing wireless devices to customers, where the wireless devices are obtained by the Sub Agent from an upstream Carrier. Included also is the step of marketing to users of the wireless devices the wireless products of the upstream Carrier to be used on the wireless devices, and marketing to the users of the wireless devices of the upstream Carrier other wireless services not provided by the upstream Carrier but provided over an internet connection by third parties. The method includes the receiving of revenues from the upstream Carrier for sales of products of the upstream Carrier to the users of the wireless devices, and receiving revenues from third parties for the sales of products provided by said third parties, and sold to users of the wireless devices.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
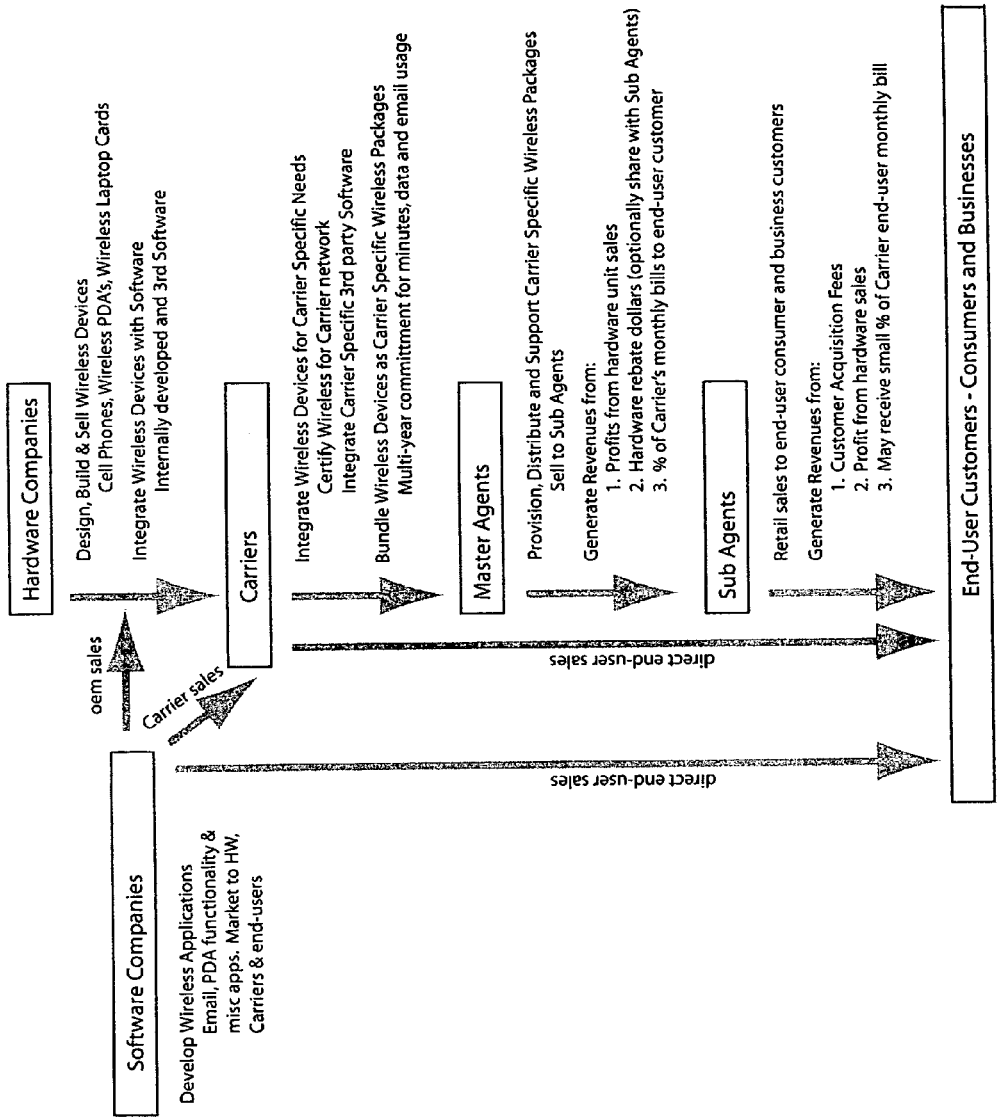
FIG. 1 is a chart illustrating the hierarchy of the wireless industry.
Figure 2:
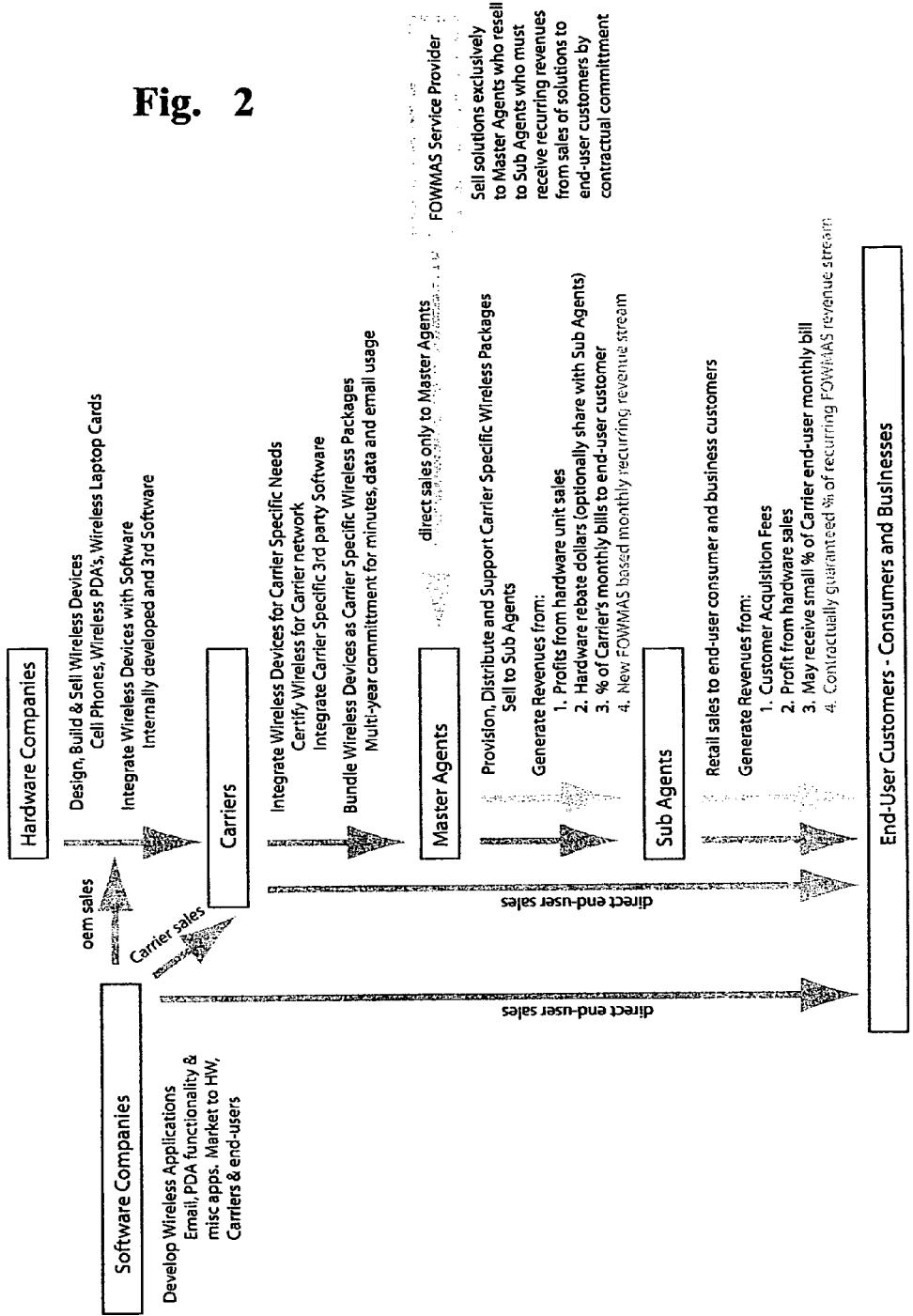
FIG. 2 is a chart illustrating the hierarchy of the wireless industry with the integration of the various features of the invention.

The business process according to the principles and concepts of the invention constitutes a highly focused effort to exploit what is termed "Franchise Oriented Wireless Mobile Application Solutions" (FOWMAS). This is an industry unprecedented offering, where for the first time, Sub Agents can powerfully leverage their existing customer base, as well as newly acquired customers, by offering a series of highly desirable wireless applications that can be installed and operated directly from the end-user customer's wireless device. The wireless application can include those that presently exist and are available over the internet by vendors, and encompass countless other applications from third parties that either presently exist or have yet to be developed that currently only sell to the end-user customers direct via the internet of other direct marketing techniques. The FOWMAS applications enable customers to strongly leverage their wireless mobile devices by gaining access to easy to use solutions that extend the capability of the device by enhancing the customers experience to better enjoy their service and business customers can significantly improve their employee productivity and possibly even generate new sources of revenues for their businesses.

The FOWMAS program will enable Master Agents and Sub Agents to generate tremendous new recurring revenue streams that heretofore were not available. As result, this will enable Master Agents and Sub Agents to better survive financial swings in their markets by smoothing their revenue streams and providing a more predictable business revenue model. Master Agents and Sub Agents essentially become a new distribution method for advanced wireless mobile application solutions that enhance end-user customer operating experience.

An example of the FOWMAS wireless services includes the following, but is not limited to the same. Those skilled in the art may enlarge the services provided by Sub Agents to further enhance the wireless services to customers.

Photomama—This is an internet based digital photography repository site that enables wireless customers to easily and securely upload from their wireless devices, organize, retrieve and share their digital photo images with others. This application leverages and extends the rapidly growing trend towards cellular telephones and other wireless devices that feature an integrated digital camera. The Sub Agent will market this wireless service to its customers who have purchased wireless devices. In order to avail themselves of the Photomama wireless service, the customer will enroll in such service with the Sub Agent, who will obtain the necessary information from the customer, such as user ID, password, etc. The customer will also enter into an agreement for the service for a specified period of time. Once enrolled, the customer can access the wireless service via the internet via the wireless device, log on and upload photographs, data text, or other images or information captured by the wireless device. The data is stored in a virtual memory hosted by the provider of the web based wireless service. The customer can later access the Photomama wireless service by way of his/her wireless device and retrieve the photographs or other information or data for display of the same on the wireless device, or send the photographs or other information to a third party via the internet.

The Photomama wireless service will most likely be owned, managed and operated by a business not related to the Master Agent or the Sub Agent, but a business that provides such service to the public. The Master Agent will preferably contract with the owner of the Photomama wireless service to provide its services to others. The Master Agent will package the wireless services for marketing by the Sub Agent who will sell the wireless services to its customers. The Sub Agent may receive revenue from the owner of the Photomama wireless service as a function of every access by a wireless customer to the Photomama wireless services. Thus, the Master Agent or the Sub Agent may obtain a revenue stream from both the owner of the Photomama wireless service as well as the customer using such service.

MySecureStuff (MSS)—This is an internet based virtual data repository that enables end-user customers to securely upload, organize and share all manner of digital files such as digital photos, word processing, spreadsheets, etc. This service would be provided by Sub Agents to wireless customers to obtain an additional source of revenue and enhance the wireless services of the customers. This service is envisioned to be operated in much the same manner as the Photomama wireless services described above.

Wireless Payment Processing—This application suite is specifically targeted to business customers who deliver goods and/or services directly to their customers and expect payment upon delivery at the customer's premises. For example, a lumber yard delivery truck driver can deliver a load of lumber to a customer, only upon swiping the customer's credit card through a wireless payment system enabled device, such as a RIM Blackberry hand held unit equipped with an integrated credit card swipe capability. Once an approval code is received by the delivery person, a separate wireless printer in the delivery truck or held by the delivery person, prints a receipt. The customer signs the receipt and the lumber is then dropped. Another example might be a limousine driver who, upon delivering their customer to their destination, would receive payment via credit card in a similar method as indicated above. COD deliveries could be enhanced by the Sub Agents providing such payment services to its wireless customers.

From the foregoing, an important feature of this innovative marketing process is that for the first time in this industry's history, a business marketing plan has been developed that leverages existing wireless mobile retailers' shelf and display space by enabling these retailers to market wireless mobile application solutions to their targeted business and consumer customers, resulting in recurring revenues for the retailer where they otherwise heretofore had no such opportunity.

While the preferred and other embodiments of the invention have been disclosed with reference to specific business models and applications, it is to be understood that many changes in detail may be made as a matter of business choices without departing from the spirit and scope of the invention, as defined by the appended claims.

What is claimed is:

1. A method of enhancing revenues for a Sub Agent marketing wireless products, comprising the steps of:
    providing to users the wireless devices of an upstream Carrier, the wireless devices configured to provide services of the upstream Carrier;
    marketing by the Sub Agent to the users of the wireless devices a wireless service not provided by the upstream Carrier but instead provided by a third party; and
    receiving, by the Sub Agent, revenues from the upstream Carrier for sales of products of the upstream Carrier to the users of the wireless devices, and receiving, by the Sub Agent, ongoing revenues from the third party for the sales of services provided by said third party and sold to users of the wireless devices.

2. The method of claim 1, further including enrolling the users of the wireless devices with the third party offering the wireless services, which are not provided by the upstream Carrier.

3. The method of claim 1, further including entering into a contract by a Master Agent with the third party for marketing the wireless services to the users of the wireless devices.

4. The method of claim 1, further including marketing by a Sub Agent who sells wireless devices to customers, ancillary wireless services allowing the user of the wireless device to capture digital information by the wireless device and upload the digital information to a virtual memory via the internet.

5. The method of claim 4, further including providing a wireless digital service of storing digital information, which wireless digital service is not provided by the upstream Carrier who provides the wireless device.

6. The method of claim 1, further including enhancing revenues of a Master Agent.

7. A method of enhancing revenues for a Sub Agent marketing wireless products, comprising the steps of:
    providing wireless devices to users, said wireless devices obtained by the Sub Agent from an upstream carrier;
    marketing by the Sub Agent to users of the wireless devices the wireless products' services of the upstream Carrier to be used on the wireless devices;
    marketing to the users of the wireless devices of the upstream Carrier other wireless services not provided by the upstream Carrier but instead are provided over an internet connection by a third party; and
    receiving, by the Sub Agent, revenues from the upstream Carrier for sales of products of the upstream Carrier to the users of the wireless devices, and receiving, by the Sub Agent, ongoing revenues from the third party for the sales of products' services provided by said third party sold to users of the wireless devices.

8. The method of claim 7, wherein the products of the third party include archival of digital data captured by the wireless devices of the users.

9. The method of claim 7, further including enhancing revenues of a Master Agent.

* * * * *